US008699092B2

(12) United States Patent
Yamasaki et al.

(10) Patent No.: US 8,699,092 B2
(45) Date of Patent: Apr. 15, 2014

(54) OPTICAL COMPONENT MOUNTING STRUCTURE, IMAGE READING DEVICE INCLUDING THE SAME, AND IMAGE FORMING APPARATUS INCLUDING THE SAME

(75) Inventors: Shunsuke Yamasaki, Osaka (JP); Hideto Miyanagi, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 194 days.

(21) Appl. No.: 13/303,222

(22) Filed: Nov. 23, 2011

(65) Prior Publication Data
US 2012/0133994 A1    May 31, 2012

(30) Foreign Application Priority Data

Nov. 25, 2010  (JP) .................................. 2010-262711
May 17, 2011  (JP) .................................. 2011-110191

(51) Int. Cl.
*H04N 1/04*   (2006.01)

(52) U.S. Cl.
USPC ........... 358/474; 347/242; 347/245; 347/257; 347/263

(58) Field of Classification Search
CPC .............................................. H02N 2201/0446
See application file for complete search history.

(56) References Cited

U.S. PATENT DOCUMENTS

| 6,762,864 | B2* | 7/2004 | Kao ............................... 358/497 |
| 7,453,487 | B2* | 11/2008 | Sato et al. ..................... 347/257 |
| 7,535,594 | B2* | 5/2009 | Yoshizawa et al. ............ 358/1.4 |
| 7,821,678 | B2* | 10/2010 | Tomita .......................... 358/474 |
| 7,869,103 | B2* | 1/2011 | Ikeda ............................ 358/498 |
| 8,044,988 | B2* | 10/2011 | Peters et al. .................. 347/257 |
| 8,223,409 | B2* | 7/2012 | Sugiyama et al. ............ 358/497 |
| 8,339,435 | B2* | 12/2012 | Yamakawa et al. ........... 347/263 |
| 8,373,910 | B2* | 2/2013 | Iwasaki et al. ................ 358/474 |
| 2006/0103906 | A1* | 5/2006 | Sato et al. ..................... 359/205 |
| 2006/0209361 | A1* | 9/2006 | Sato ............................... 358/474 |
| 2008/0304114 | A1* | 12/2008 | Wu et al. ....................... 358/497 |
| 2009/0168133 | A1* | 7/2009 | Narita ....................... 359/207.11 |

FOREIGN PATENT DOCUMENTS

| JP | 2002-347281 | 12/2002 |
| JP | 2007-139932 | 6/2007 |
| JP | 2007139932 A * | 6/2007 |
| JP | 2008-172564 | 7/2008 |

* cited by examiner

*Primary Examiner* — Dung Tran
(74) *Attorney, Agent, or Firm* — Smith, Gambrell & Russell, LLP

(57) ABSTRACT

An optical component mounting structure includes an elastic member and a mounting portion. The elastic member applies pressure to an optical component toward a flat surface portion of a base. The mounting portion is provided at the base and mounts the elastic member. The elastic member has a pressing portion, a holding portion, and a positioning hole. The pressing portion has a tongue piece shape and elastically comes in contact with a light guide member. The holding portion supports one end of the pressing portion and holds elastically the mounting portion of the base. The positioning hole is formed through the holding portion and is to be engaged with each of a pair of positioning convex portions provided at the mounting portion of the base.

15 Claims, 6 Drawing Sheets

OPTICAL COMPONENT MOUNTING STRUCTURE, IMAGE READING DEVICE INCLUDING THE SAME, AND IMAGE FORMING APPARATUS INCLUDING THE SAME

This application is based on Japanese Patent Application No. 2010-262711 filed on Nov. 25, 2010 and Japanese Patent Application No. 2011-110191 filed on May 17, 2011, the contents of which are hereby incorporated by reference.

BACKGROUND

1. Field

The present disclosure relates to a mounting structure for securely holding an optical component, an image reading device including the optical component mounting structure, and an image forming apparatus including the optical component mounting structure.

2. Description of Related Art

Conventionally, image forming apparatuses are configured as follows. That is, an image on an original document as a subject of image formation is read by an image reading device, and based on original document image data thus read, a photosensitive member that is an image bearing member is irradiated with laser light, so that an electrostatic latent image is formed on a surface of the photosensitive member. In the image reading device, optical components are used, such as a mirror that reflects light in order that light from the original document being illuminated can be read and a lens that condenses light onto an optical sensor portion. Furthermore, also in an exposure unit that irradiates the photosensitive member with laser light, there are disposed optical components such as a polygon mirror that performs scanning with laser light and lenses and mirrors for guiding a light beam reflected by the polygon mirror to the photosensitive member.

There is known a mounting structure for mounting such an optical component by applying pressure thereto by use of a leaf spring. In one example of this mounting structure, as an optical component, a horizontally long mirror having a rectangular cross section is mounted, and this is achieved by applying pressure by use of a leaf spring to the mirror at each of both end portions thereof in its longitudinal direction. Specifically, the leaf spring is bent into an L-shape at a plurality of points so as to have three pressing portions. In order to mount the mirror, in a state where the mirror is placed in a housing, with a surface thereof on the opposite side to its reflection surface being in contact with a contact portion of the housing, the leaf spring is fixed at one end to the housing by use of a screw, so that, by the pressing portions of the leaf spring, pressure is applied to the mirror at two locations that are an upper and lower portions of the reflection surface and at a side surface thereof.

According to the above-described technique of the mounting structure, however, in order to mount the optical component, the leaf spring is mounted to the housing by use of the screw. This configuration, therefore, requires that a hole into which the screw is screwed be formed through each of the leaf spring and the housing, leading to a size increase of members, and involves an operation of screwing and unscrewing the screw and the use of a tool for mounting the optical component, making an operation of mounting the optical component complicated, which have been disadvantageous.

SUMMARY

It is an object of the present disclosure to provide an optical component mounting structure that causes an optical component to be easily mounted and reliably held, an image reading device including the same, and an image forming apparatus including the same.

An optical component mounting structure according to one aspect of the present disclosure includes an elastic member and a mounting portion. The elastic member applies pressure to the optical component toward a flat surface portion of a base. The mounting portion is provided at the base and mounts the elastic member. The elastic member has a pressing portion, a holding portion, and a member-side positioning portion. The pressing portion elastically comes in contact with the optical component. The holding portion supports one end of the pressing portion and holds elastically the mounting portion of the base. The member-side positioning portion is to be engaged with a base-side positioning portion provided at the mounting portion and is formed at the holding portion.

Furthermore, an optical component mounting structure according to another aspect of the present disclosure includes an elastic member and a mounting portion. The elastic member applies pressure to an optical component toward a flat surface portion of a base. The mounting portion is provided at the base and mounts the elastic member. The elastic member has a pressing portion and a holding portion. The pressing portion elastically comes in contact with the optical component. The holding portion supports one end of the pressing portion and holds elastically the mounting portion of the base. The optical component is placed so as to protrude with respect to an end surface of the base. The pressing portion has a first pressing portion and a second pressing portion. The first pressing portion comes in contact with a front part of the optical component with respect to a gravity center position of the optical component relative to a direction in which the optical component protrudes. The second pressing portion comes in contact with a rear part of the optical component with respect to the gravity center position of the optical component relative to the direction in which the optical component protrudes.

Still other objects of the present disclosure and specific advantages provided by the present disclosure will be made further apparent from the following descriptions of embodiments.

DETAILED DESCRIPTION OF PREFERRED EMBODIMENTS

The following describes embodiments of the present disclosure with reference to the appended drawings without limiting the present disclosure thereto. Furthermore, an intended use of the disclosure and terms and the like used in the following description are not to be construed as limiting.

First Embodiment

Figure 1:
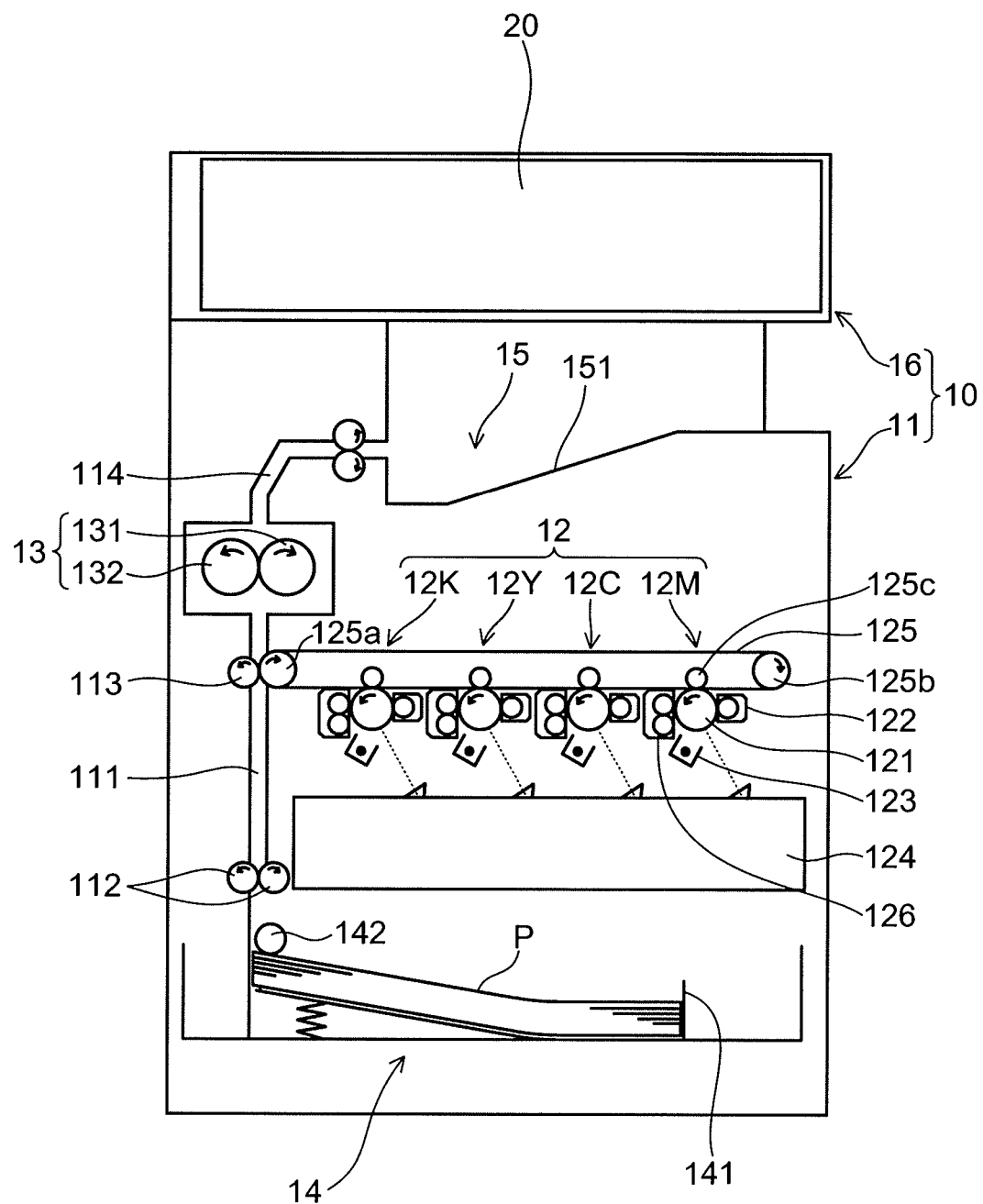
FIG. 1 is a schematic diagram showing an image forming apparatus according to a first embodiment of the present disclosure.

FIG. 1 is a schematic diagram showing an image forming apparatus according to an embodiment of the present disclosure. An image forming apparatus 10 is an in-body paper ejection type tandem color copy machine and includes a lower apparatus main body 11 and an upper apparatus main body 16.

In the lower apparatus main body 11, a paper feed portion 14, an image forming portion 12, and a fixing portion 13 are provided, and in the upper apparatus main body 16, an image reading device 20 that reads an image on an original document is provided. A paper ejection space 15 is formed between the lower apparatus main body 11 and the upper apparatus main body 16, and a paper sheet P after having undergone fixing processing is ejected into the paper ejection space 15.

The image forming portion 12 forms a toner image on the paper sheet P fed from the paper feed portion 14, and in the image forming portion 12, a magenta unit 12M, a cyan unit 12C, a yellow unit 12Y, and a black unit 12K are provided in order from an upstream side toward a downstream side in a rotation direction of an intermediate transfer belt 125.

In each of these image forming units 12M, 12C, 12Y, and 12K, a photosensitive member 121 that is an image bearing member is provided, and a development portion 122, an exposure unit 124, a charging portion 123, and a cleaning portion 126 are provided around the photosensitive member 121.

The development portion 122 is disposed on the right of the photosensitive member 121 so as to be opposed thereto and supplies toner to the photosensitive member 121. The charging portion 123 is disposed on an upstream side of the development portion 122 relative to a photosensitive member rotation direction so as to be opposed to the surface of the photosensitive member 121 and charges the surface of the photosensitive member 121 in a uniform manner.

The exposure unit 124 is intended to scan-expose the photosensitive member 121 based on image data such as characters and patterns read by the image reading device 20 and is provided below the photosensitive member 121. In the exposure unit 124, there are provided a laser light source, a polygon mirror, and so on, which are not shown, and laser light emitted from the laser light source is applied to the surface of the photosensitive member 121 via the polygon mirror from a downstream side of the charging portion 123 in the photosensitive member rotation direction. The applied laser light is used to form an electrostatic latent image on the surface of the photosensitive member 121, and the electrostatic latent image thus formed is developed into a toner image by the development portion 122.

The endless intermediate transfer belt 125 is laid in a tensioned condition over a drive roller 125a and a tension roller 125b. The drive roller 125a is driven to rotate by an unshown motor, and the intermediate transfer belt 125 is driven circularly by the rotation of the drive roller 125a.

The photosensitive members 121 are arranged below the intermediate transfer belt 125 so as to be in contact therewith along a conveying direction adjacently to each other. A primary transfer roller 125c is opposed to the photosensitive member 121 via the intermediate transfer belt 125 and comes in press-contact with the intermediate transfer belt 125 to form a primary transfer portion. At this primary transfer portion, at prescribed timing relative to the rotation of the intermediate transfer belt 125, toner images on the photosensitive members 121 are sequentially transferred onto the intermediate transfer belt 125. The toner images of the four colors of magenta, cyan, yellow, and black are thus superposed on one another to form a toner image on the surface of the intermediate transfer belt 125.

A secondary transfer roller 113 is opposed to the drive roller 125a via the intermediate transfer belt 125 and comes in press-contact with the intermediate transfer belt 125 to form a secondary transfer portion. At this secondary transfer portion, the toner image on the surface of the intermediate transfer belt 125 is transferred onto the paper sheet P. After the toner image is transferred onto the paper sheet P, an unshown belt cleaning portion cleans off toner remaining on the intermediate transfer belt 125.

In a lower portion of the image forming apparatus 10, the paper feed portion 14 is provided, and in the paper feed portion 14, a paper tray 141 is provided that stores the paper sheet P and is demountably mounted in the apparatus main body 11. On the left of the paper feed portion 14, a first paper conveying path 111 is provided along which the paper sheet P fed out from the paper tray 141 by a pick-up roller 142 is conveyed by a pair of conveying rollers 112 to the secondary transfer portion on the intermediate transfer belt 125. Moreover, in an upper left portion of the image forming apparatus 10, there are provided the fixing portion 13 that performs fixing processing with respect to the paper sheet P on which the image has been formed and a second paper conveying path 114 along which the paper sheet that has undergone the fixing processing is conveyed onto a paper ejection tray 151.

The paper sheet P is conveyed to the secondary transfer portion in synchronization with the timing of an image forming operation on the intermediate transfer belt 125 and with the timing of a paper feeding operation. Onto the paper sheet P conveyed to the secondary transfer portion, the toner image on the intermediate transfer belt 125 is secondarily transferred by the secondary transfer roller 113 to which a bias potential has been applied, and the paper sheet P is then conveyed to the fixing portion 13.

The fixing portion 13 includes a fixing roller 131 that is heated by a heat source and a pressing roller 132 provided so as to be in press-contact with the fixing roller 131 and performs fixing processing by applying heat and pressure to the paper sheet P onto which the toner image has been transferred. The paper sheet P on which the toner image has been thus fixed is ejected onto the paper ejection tray 151 by a pair of ejection rollers via the second paper conveying path 114.

Figure 2:
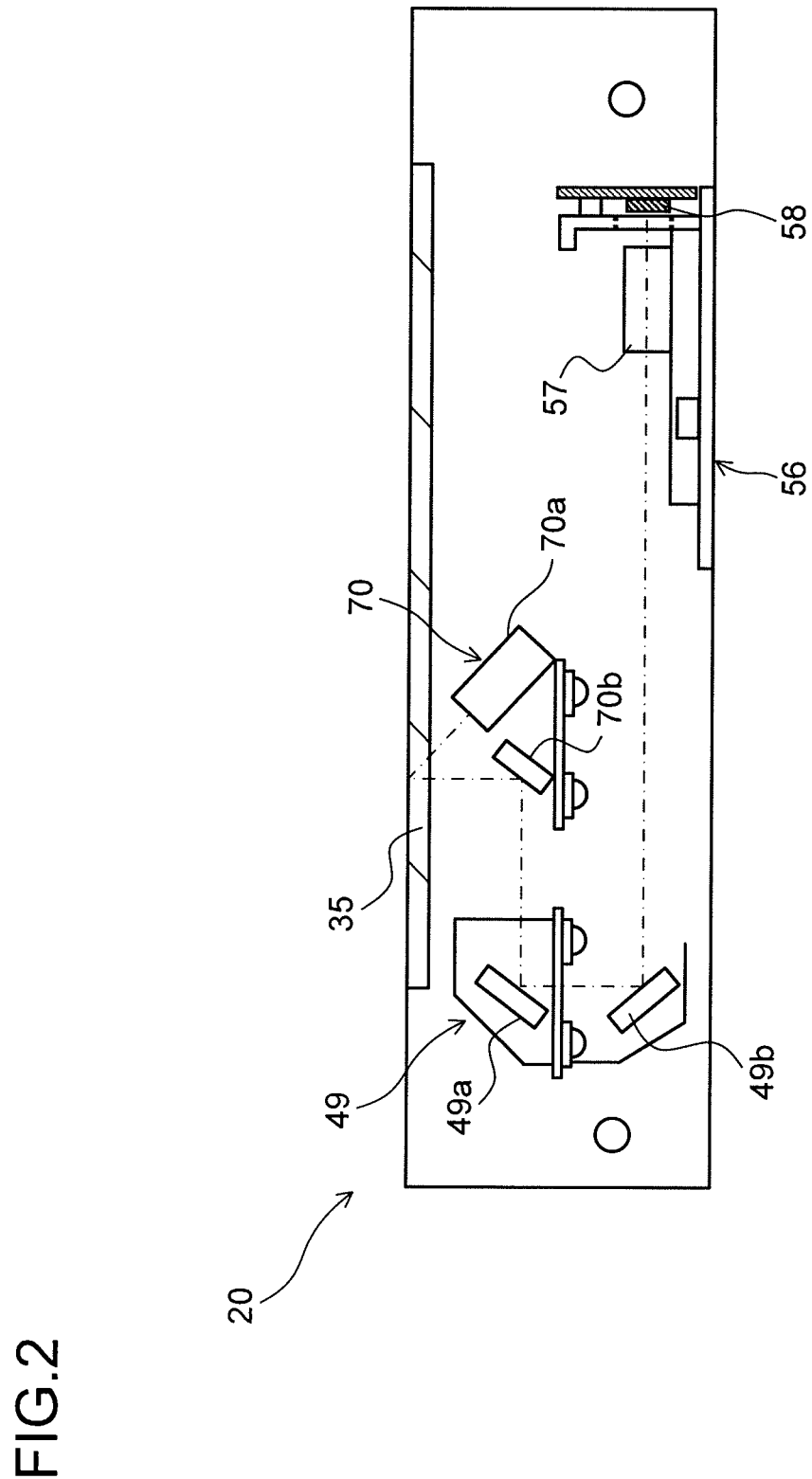
FIG. 2 is a schematic side view showing an image reading device according to the first embodiment of the present disclosure.

FIG. 2 is a side view showing the image reading device. The image reading device 20 includes a contact glass 35 on which an original document to be read is placed, an illumination unit 70 provided below the contact glass 35, a mirror unit 49 provided on the left of the illumination unit 70, and an imaging unit 56 provided on the right of the mirror unit 49.

The illumination unit 70 and the mirror unit 49 are connected to an unshown scanning mechanism portion that moves at a prescribed speed in the lateral direction of FIG. 2 so that an original document placed on the contact glass 35 is exposure-scanned, and thus the original document can be read across its entire surface.

The illumination unit 70 includes a light source portion 70a that irradiates an original document on the contact glass 35 with illumination light and a scanning mirror 70b that reflects reflected light from the original document toward the mirror unit 49.

The mirror unit 49 includes a pair of scanning mirrors 49a and 49b that are provided so as to be opposed to each other in the vertical direction, and light reaching from the scanning mirror 70b of the illumination unit 70 is reflected sequentially by the scanning mirrors 49a and 49b to be guided to the imaging unit 56.

The imaging unit 56 includes a condenser lens 57 and an image sensor 58 provided on the right of the condenser lens 57. The condenser lens 57 forms an image of reflected light from an original document, which has become incident via the scanning mirror 49b, on the image sensor 58. The image sensor 58 has imaging elements such as CCDs, which are arranged in a direction perpendicular to a direction in which the original document is scanned, and converts the optical image of the original document thus formed by the condenser lens 57 into an electric signal.

When reading of an image on an original document is performed, while the original document is illuminated by the illumination unit 70, the illumination unit 70 moves at a prescribed speed in the right direction, and the mirror unit 49 moves at a speed half the moving speed of the illumination unit 70 in the same direction. As a result, reflected light from the original document, which originates in illumination light of the illumination unit 70, is reflected by the mirror unit 49 to be guided to the condenser lens 57 of the imaging unit 56, and, by the condenser lens 57, an image thereof is formed on the image sensor 58. The thus formed optical image of the original document is converted into an electric signal by the image sensor 58, and the image is read based on the electric signal. Alternatively, a sheet-through type image reading device may be used to read an original document. In this case, in a state where the illumination unit 70 and the mirror unit 49 are held at their respective prescribed positions, an original document is conveyed over the contact glass 35 by an unshown original document conveying portion so that the original document is read across its entire surface, and image data is formed accordingly.

Figure 3:
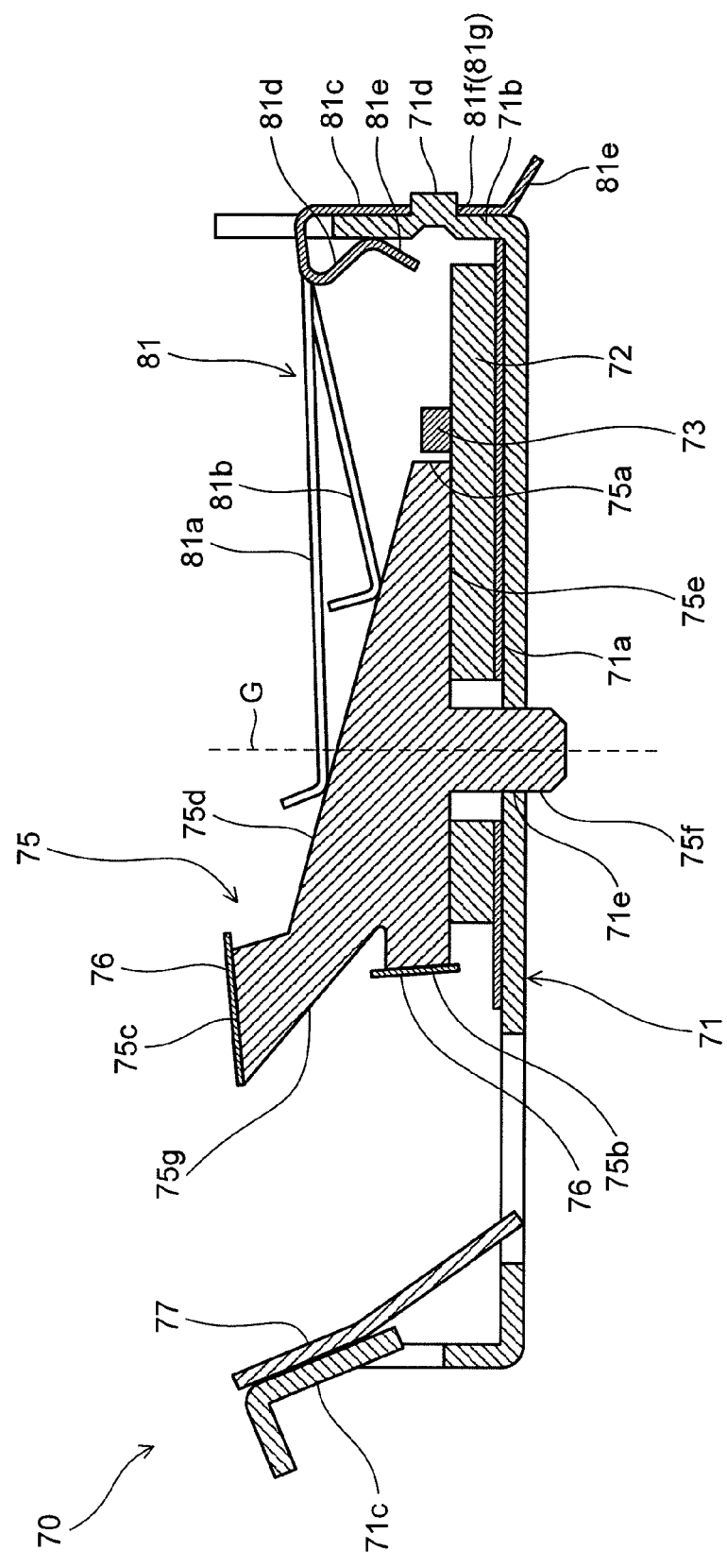
FIG. 3 is a cross-sectional side view showing an illumination unit used in the image reading device according to the first embodiment of the present disclosure.
Figure 4:
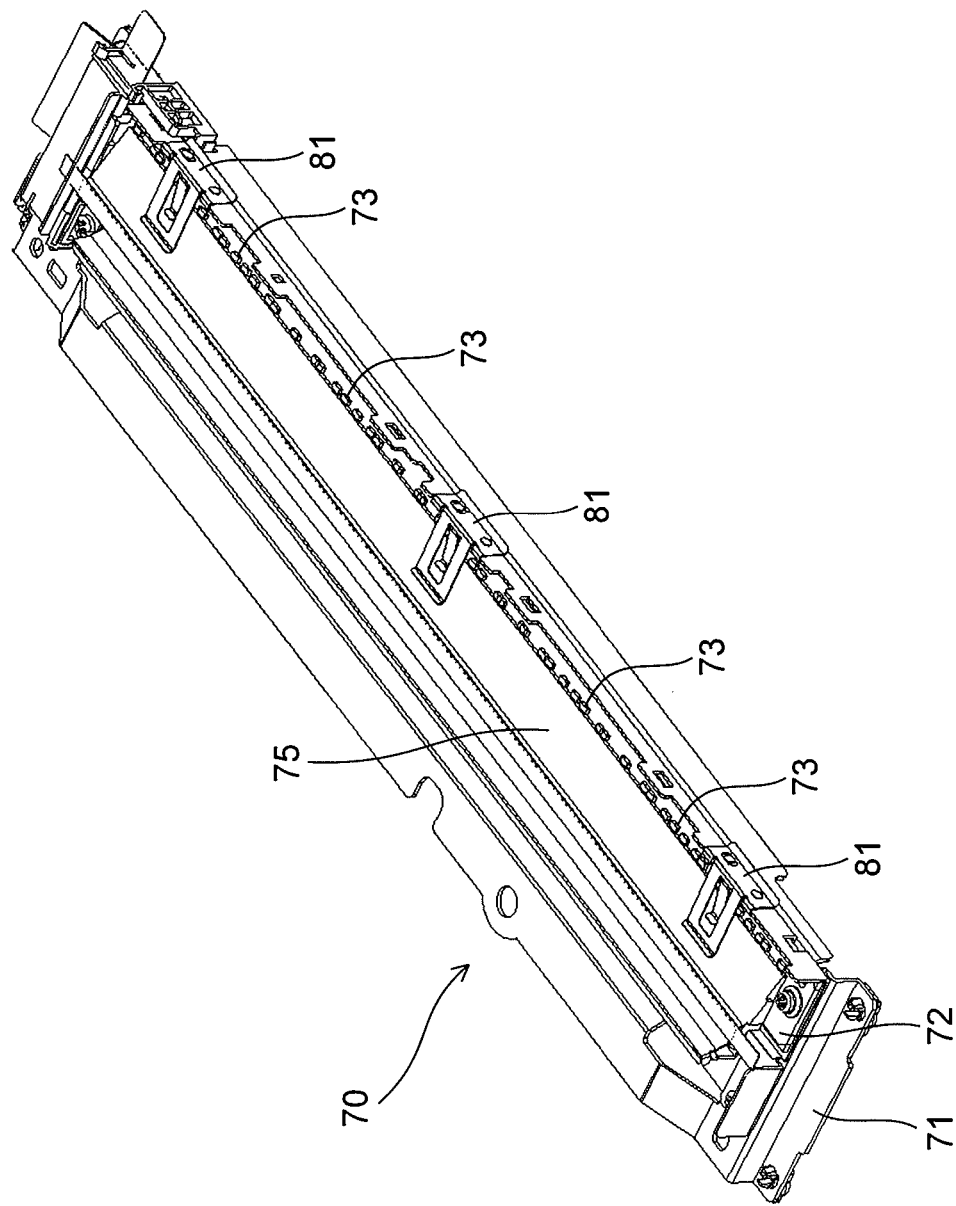
FIG. 4 is a perspective view showing the illumination unit according to the first embodiment of the present disclosure.
Figure 5:
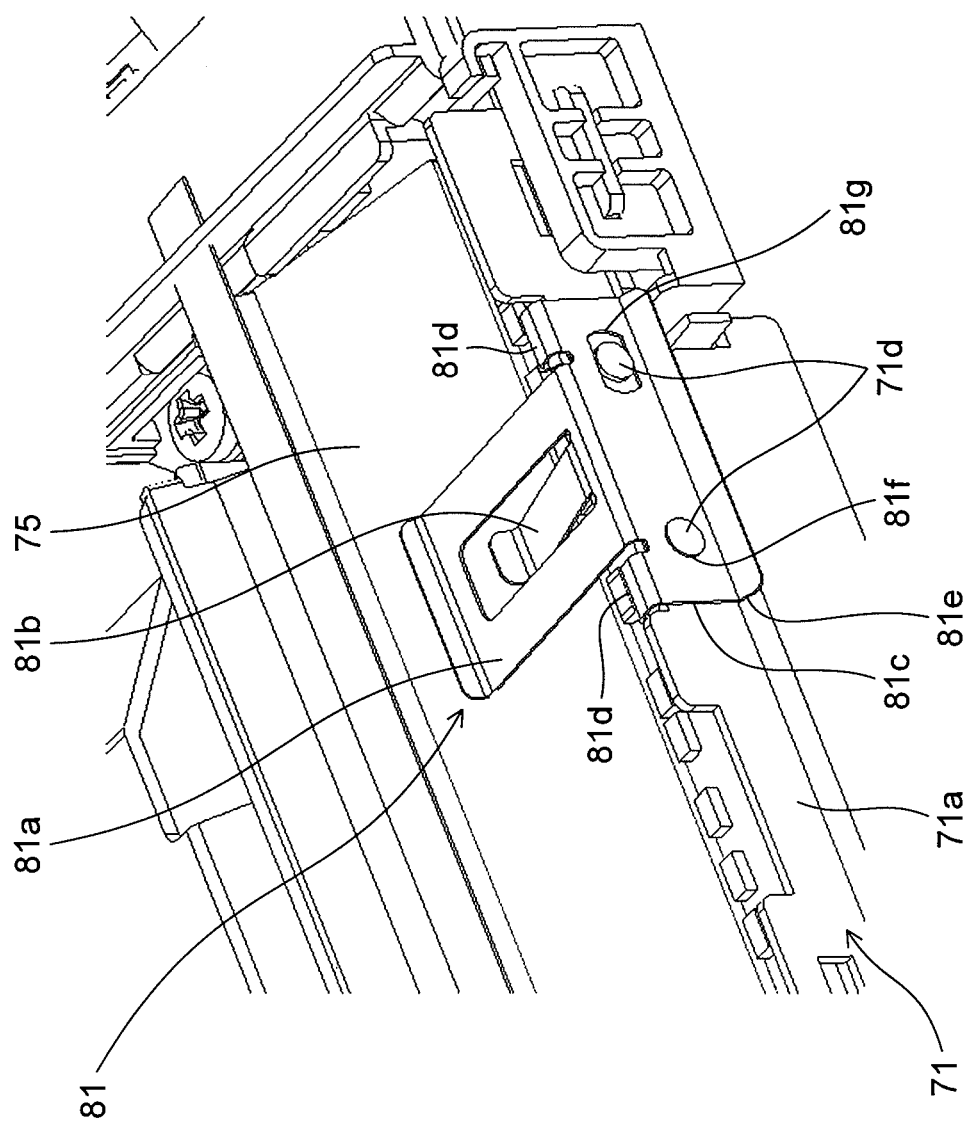
FIG. 5 is a perspective view showing an optical component mounting structure according to the first embodiment of the present disclosure.

Next, referring to FIGS. 3 to 5, the following describes an optical component mounting structure. FIG. 3 is a cross-sectional side view showing the light source portion of the illumination unit used in the above-described image reading device, and FIG. 4 is a perspective view showing the light source portion of the illumination unit. FIG. 5 is a perspective view showing an optical component mounting structure.

As shown in FIG. 3, the illumination unit 70 uses, as a light source, a light emitting element 73 such as an LED and includes a circuit board 72 on which the light emitting element 73 is mounted, a light guide member 75 that guides light emitted from the light emitting element 73 to the contact glass 35 (see FIG. 2), a mirror 77 that guides light emitted from the light emitting element 73 via the light guide member 75 to the contact glass 35, a base 71 that is a base to which the mirror 77 is mounted and on which the light guide member 75 is placed via the circuit board 72, and an elastic member 81 that holds the light guide member 75 that is an optical component by applying pressure thereto.

The base 71 is obtained by subjecting a metal plate of iron or the like to sheet-metal processing and has a flat surface portion 71a provided to extend in the horizontal direction, a mounting portion 71b provided so as to stand perpendicularly on the flat surface portion 71a, a positioning convex portion 71d as a base-side positioning portion, which is used for positioning of the elastic member 81, and a mirror supporting portion 71c disposed on the opposite side to the mounting portion 71b and provided so as to be inclined at a prescribed angle with respect to the flat surface portion 71a. Alternatively, as the base 71, a base obtained by molding a resin material into a prescribed shape may be used.

The light guide member 75 is made of a translucent material such as an acrylic resin. Furthermore, the light guide member 75 has a light receiving surface 75a that is disposed so as to be opposed to the light emitting element 73 provided on the circuit board 72 and on which light emitted from the light emitting element 73 becomes incident, and a first emission surface 75b and a second emission surface 75c from which light that has become incident from the light receiving surface 75a is emitted. The light guide member 75 further has an upper surface 75d with which the elastic member 81 comes in contact, a lower surface 75e facing the circuit board 72 from above, an engagement protrusion 75f used to mount the light guide member 75 at a prescribed position relative to the base 71, and a reflection surface 75g.

On each of the first and second emission surfaces 75b and 75c of the light guide member 75, a light diffusion sheet 76 that diffuses light emitted from the first and second emission surfaces 75b and 75c is provided. As the light diffusion sheet 76, a resin film having a diffusion surface on which microscopic asperities are formed can be used, and the light diffusion sheet 76 is attached to each of the first and second emission surfaces 75b and 75c by use of an adhesive.

The mirror 77 is provided at a position opposed to the first emission surface 75b. The mirror 77 is so mounted to the mirror supporting portion 71c of the base 71 that light emitted from the first emission surface 75b is reflected toward the contact glass 35 (see FIG. 2).

The second emission surface 75c is formed so as to be inclined at a prescribed angle with respect to the lower surface 75e and guides light emitted from the second emission surface 75c to the contact glass 35. Thus, emitted light from the second emission surface 75c illuminates substantially the same position on the contact glass 35 as the position illuminated with emitted light from the first emission surface 75b.

The upper surface 75d of the light guide member 75 is a surface formed between the second emission surface 75c and the light receiving surface 75a. In order that an increased amount of light may reach the second emission surface 75c from the light receiving surface 75a, the upper surface 75d is formed so as to be inclined such that it is higher in height on the side of the second emission surface 75c.

With the light guide member 75 configured as above, light from the light emitting element 73 becomes incident on the light receiving surface 75a of the light guide member 75. With respect to the light, which has become incident on the light receiving surface 75a and is then transmitted through the light guide member 75, a part thereof is emitted in a diffused manner from the first emission surface 75b via the light diffusion sheet 76. The part of the light emitted from the first emission surface 75b is reflected at the mirror 77 to illuminate an original document on the contact glass 35. Furthermore, with respect to the light, which has become incident on the light receiving surface 75a and is then transmitted through the light guide member 75, another part thereof is reflected at the reflection surface 75g toward the second emission surface 75c and is then emitted in a diffused manner from the second emission surface 75c via the light diffusion sheet 76. The part of the light emitted from the second emission surface 75c, together with the part of the light emitted from the first emission surface 75b, illuminates the original document on the contact glass 35.

As shown in FIG. 4, the light guide member 75 is formed to extend in the longitudinal direction so as to correspond to the width direction of an original document, and a plurality of light emitting elements 73 are mounted on the circuit board 72 so as to be aligned in the longitudinal direction. Thus, when light is emitted from the light emitting elements 73, an original document on the contact glass 35 (see FIG. 2) is illuminated linearly in the width direction via the light guide member 75 and the mirror 77 (see FIG. 3).

By three elastic members 81 disposed at an equal space from each other in the longitudinal direction, pressure is applied to the light guide member 75 toward the base 71, and thus the light guide member 75 is reliably held.

As shown in FIG. 5, the elastic member 81 is obtained by forming a plate material of stainless steel or the like having a spring property into a prescribed shape by sheet-metal processing. The elastic member 81 has a first pressing portion 81a and a second pressing portion 81b that elastically come in contact with the light guide member 75, a holding portion 81c that is a base body of the elastic member 81, a holding portion 81d (see also FIG. 3) used as a pair with the holding portion 81c and opposed to the holding portion 81c at each of both end portions of the holding portion 81c, a guiding portion 81e (see also FIG. 3), and positioning holes 81f and 81g as member-side positioning portions.

The positioning hole 81f as one of the positioning holes 81f and 81g is a round hole to be engaged with one of a pair of positioning convex portions 71d provided at the base 71, and the positioning hole 81g as the other of the positioning holes 81f and 81g is a elongate hole elongated in the longitudinal direction, which is to be engaged with the other of the pair of positioning convex portions 71d of the base 71. Since the positioning hole 81g is formed in the form of a elongate hole, even if the accuracy of relative positions between the pair of positioning convex portions 71d provided at the base 71 and the positioning holes 81f and 81g of the elastic member 81 is low, a positional error resulting from the low accuracy is absorbed by the elongate hole as the positioning hole 81g, and thus the elastic member 81 can be reliably mounted to the base 71.

Referring back to FIG. 3, the holding portions 81c and 81d are formed so as to be continuous with each other at their upper portions, while being opposed to each other in a concave shape, and have an elastic force acting in such a direction as to approach each other. When the holding portions 81c and 81d are fitted against the elastic forces to hold the mounting portion 71b of the base 71, the elastic member 81 is held to the mounting portion 71b by the elastic forces of the holding portions 81c and 81d. According to this configuration, the elastic member 81 can be easily mounted to the base 71, and the light guide member 75 can be reliably held by the elastic member 81.

Furthermore, the holding portion 81c is formed to extend longer than the holding portion 81d, and the guiding portion 81e is formed at a tip end portion of each of the holding portions 81c and 81d. The guiding portion 81e is formed so as to be bent outwardly at an acute angle, so that when the holding portions 81c and 81d are fitted to hold the mounting portion 71b of the base 71, the elastic member 81 is guided along the inclination of the guiding portion 81e of the holding portion 81c and is then guided along the inclination of the guiding portion 81e of the holding portion 81d. According to this configuration, by fitting the elastic member 81 so as to hold the mounting portion 71b of the base 71 along the inclination of the guiding portion 81e, even without the use of a tool or the like, the elastic member 81 can be easily mounted to the base 71.

Furthermore, since the mounting portion 71b of the base 71 is provided so as to stand from the flat surface portion 71a toward the light guide member 75, the configuration of the elastic member 81 having the holding portions 81c and 81d and the first and second pressing portions 81a and 81b is simplified, and thus the elastic member 81 can be easily formed by sheet-metal processing or the like.

The circuit board 72 is mounted to the flat surface portion 71a of the base 71 by use of a screw or the like, and the light guide member 75 is placed on the circuit board 72. At this time, the engagement protrusion 75f protruding from the lower surface 75e of the light guide member 75 is caused to penetrate through a relief hole of the circuit board 72 to be engaged with an engagement hole 71e provided through the base 71. With respect to the engagement protrusion 75f and the engagement hole 71e as one set, at least two sets thereof are provided in the longitudinal direction so as to allow positioning of the light guide member 75 to a prescribed position on the base 71. Disposing the light guide member 75 and the circuit board 72 in this manner brings about a state where the light receiving surface 75a of the light guide member 75 is closely opposed to the light emitting element 73 on the circuit board 72, and the first emission surface 75b of the light guide member 75 protrudes with respect to the left-side end surface of the circuit board 72. Since the first emission surface 75b is in a state of protruding with respect to the circuit board 72, there is no possibility that light emitted from the first emission surface 75b is blocked by the end surface of the circuit board 72, and thus emitted light can be delivered to the mirror 77 across a wide area thereof.

Since, however, as described above, the light guide member 75 protrudes on the side of the first and second emission surfaces 75b and 75c with respect to the end surface of the circuit board 72, the light guide member 75 is being placed in an unstable state on the circuit board 72. Furthermore, the light guide member 75 has a volume larger on the side of the first and second emission surfaces 75b and 75c compared with the volume thereof on the side of the light receiving surface 75a. Because of this, a gravity center position G of the light guide member 75 deviates to the side of the first and second emission surfaces 75b and 75c, as a result of which the light guide member 75 is being placed in a further unstable state on the circuit board 72.

As a solution to this, the first pressing portion 81a and the second pressing portion 81b of the elastic member 81 are configured to apply pressure to the upper surface 75d of the light guide member 75 from both sides of the gravity center position G of the light guide member 75 relative to a direction in which the light guide member 75 protrudes. In order to apply pressure to the light guide member 75, the first and second pressing portions 81a and 81b have an elastic force acting toward the upper surface 75d of the light guide member 75, and the first pressing portion 81a comes in contact with the upper surface 75d of the light guide member 75 on the left side of the gravity center position G, while the second pressing portion 81b comes in contact with the upper surface 75d at a position close to the light receiving surface 75a of the light guide member 75 on the right side of the gravity center position G.

Thus, even if the light guide member 75 is placed in an unstable state, or even if the gravity center of the light guide member 75 is not at a center portion of the member but at a position deviating therefrom, the above-described configuration causes the light guide member 75 to be reliably held. Furthermore, with the above-described configuration, the light guide member 75 can be prevented from being inclined or positionally displaced due to vibrations or an impact applied thereto, and thus the light guide member 75 can be held without detriment to its optical performance.

Furthermore, since the second pressing portion 81b comes in contact with the upper surface 75d at a position close to the light receiving surface 75a of the light guide member 75, the accuracy of mounting positions of the light receiving surface 75a of the light guide member 75 and the light emitting element 73 on the circuit board 72 is improved.

As shown in FIG. 5, each of the first and second pressing portions 81a and 81b is provided to extend in a tongue piece shape from an upper end portion of the holding portion 81c that is the base body. The first pressing portion 81a extends to form a U-shape from the holding portion 81c, and the second pressing portion 81b is formed in a rectangular shape within a space inside the U-shape of the first pressing portion 81a. A contact portion of each of the first and second pressing portions 81a and 81b with respect to the light guide member 75 is a portion bent into an arc shape in cross section. This prevents, when the first and second pressing portions 81a and 81b elastically come in contact with the light guide member 75, the upper surface 75d of the light guide member 75 from being damaged by the first and second pressing portions 81a and 81b.

Depending on the weight and gravity center position of the light guide member 75 and on the amount of protrusion of the light guide member 75 from the circuit board 72, the length and width of each of the first and second pressing portions 81a and 81b and flexibility of the contact portion thereof are set to be appropriate, and thus each of the first and second pressing portions 81a and 81b is set to apply a proper pressing force to the light guide member 75, so that the light guide member 75 is securely held in a stable state on the base 71 via the circuit board 72.

Second Embodiment

Figure 6:
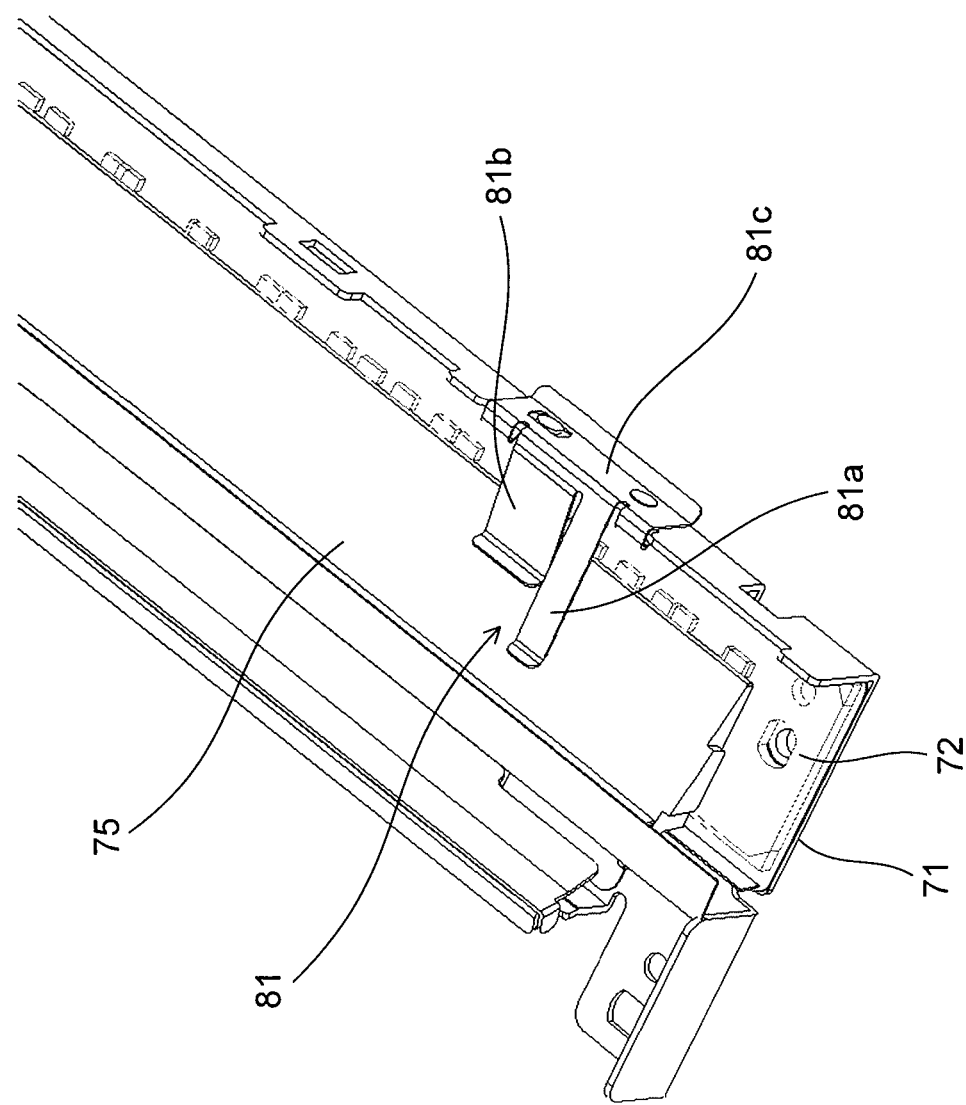
FIG. 6 is a perspective view showing an optical component mounting structure according to a second embodiment of the present disclosure.

FIG. 6 is a perspective view showing an optical component mounting structure according to a second embodiment. In the second embodiment, a first and second pressing portions 81a and 81b of an elastic member 81 are different in shape from those in the first embodiment. In the following, the elastic member 81 different from that in the first embodiment, therefore, is mainly described, and descriptions of the same constituent parts as those used in the first embodiment are omitted.

Each of the first and second pressing portions 81a and 81b is provided to extend in a tongue piece shape from an upper end portion of a holding portion 81c that is a base body. The first pressing portion 81a is formed in a rectangular shape, and the second pressing portion 81b is formed in a square shape at a position adjacent to the first pressing portion 81a. The first and second pressing portions 81a and 81b apply pressure to a light guide member 75 from both sides of a gravity center position G (see FIG. 3) relative to a direction in which the light guide member 75 protrudes. A contact portion of each of the first and second pressing portions 81a and 81b with respect to the light guide member 75 is a portion bent into an arc shape in cross section. This prevents, when the first and second pressing portions 81a and 81b elastically come in contact with the light guide member 75, an upper surface 75d of the light guide member 75 from being damaged by the first and second pressing portions 81a and 81b.

When provided with the mounting structure for an optical component such as the light guide member 75 according to either of the foregoing embodiments, the image reading device 20 can be configured so as to cause the light guide member 75 to be easily mounted and reliably held.

Each of the foregoing embodiments describes an example of a case where, as an optical component, the light guide member 75 is mounted to an image reading device. The present disclosure, however, is not limited thereto and may be applied to a case where, as an optical component, a mirror, a lens, a prism, or the like is mounted to an image forming apparatus or to an optical apparatus such as an imaging apparatus or an image projection apparatus, and the optical component may have any of various shapes such as a rectangular parallelepiped shape, a triangular prism shape, and a cylindrical column shape.

Furthermore, each of the foregoing embodiments describes a configuration in which the elastic member 81 has the two pressing portions 81a and 81b. The present disclosure, however, is not limited thereto and may be configured to have one pressing portion or three or more pressing portions. Such cases also provide similar effects to those provided by the foregoing embodiments.

Furthermore, each of the foregoing embodiments describes a configuration in which the light guide member 75 that is an optical component is placed on the base 71 via the circuit board 72, and by the elastic member 81, pressure is applied to the light guide member 75 toward the base 71. The present disclosure, however, is not limited thereto and may have a configuration in which the light guide member 75 is placed directly on the base 71, and by the elastic member 81, pressure is applied to the light guide member 75 toward the base 71. Furthermore, a configuration also may be adopted in which, on the base 71, the light guide member 75 is directly placed in an unstable state of protruding with respect to an end surface of the base 71, and the elastic member 81 applies pressure toward the base 71 from both sides of a gravity center position of the light guide member 75 relative to a direction in which the light guide member 75 protrudes. Such cases also provide similar effects to those provided by the foregoing embodiments.

Furthermore, each of the foregoing embodiments describes a configuration in which the pair of positioning convex portions 71d are used as the base-side positioning portions, and positioning holes 81f and 81g are used as the member-side positioning portions. The present disclosure, however, is not limited thereto and may be configured to use holes as the base-side positioning portions and convex portions as the member-side positioning portions.

The present disclosure can be utilized as a mounting structure for securely holding an optical component, as an image reading device including the optical component mounting structure, and as an image forming apparatus including the optical component mounting structure, which is used in any of apparatuses utilizing an electrophotographic method such as a copy machine, a printer, a facsimile, and a complex machine having functions of these apparatuses.

What is claimed is:

1. An optical component mounting structure, comprising:
   an elastic member for applying pressure to an optical component toward a flat surface portion of a base; and
   a mounting portion that is provided at the base and to which the elastic member is mounted,
   wherein the elastic member has:
      a pressing portion that elastically comes in contact with the optical component;
      a holding portion that supports one end of the pressing portion and is mounted in such a manner as to elastically sandwich the mounting portion of the base; and
      a member-side positioning portion that engages with a base-side positioning portion provided at the mounting portion and that is formed at the holding portion.

2. The optical component mounting structure according to claim 1, wherein a guiding portion that is formed so as to be inclined outwardly is provided at a tip end of the holding portion.

3. The optical component mounting structure according to claim 1, wherein the mounting portion is provided so as to stand from the flat surface portion toward a side of the optical component.

4. The optical component mounting structure according to claim 1, wherein
the base-side positioning portion comprises a pair of positioning convex portions aligned in a longitudinal direction of the optical component, and
the member-side positioning portion comprises a round hole that engages with one of the pair of positioning convex portions and a elongate hole that is formed to be elongated in the direction in which the pair of positioning convex portions are aligned and engages with the other of the pair of positioning convex portions.

5. The optical component mounting structure according to claim 1, wherein
the pressing portion has:
a first pressing portion that comes in contact with the optical component; and
a second pressing portion that comes in contact with the optical component at a position different from a position at which the first pressing portion comes in contact with the optical component.

6. The optical component mounting structure according to claim 5, wherein
the first pressing portion is provided to extend to form a U-shape from the holding portion, and
the second pressing portion is provided within a space inside the U-shape of the first pressing portion.

7. The optical component mounting structure according to claim 5, wherein
the second pressing portion is provided so as to be aligned with the first pressing portion in a longitudinal direction of the optical component.

8. The optical component mounting structure according to claim 1, wherein
the pressing portion has a contact portion bent into an arc shape in cross section, and the contact portion elastically comes in contact with the optical component.

9. The optical component mounting structure according to claim 1, comprising a plurality of the elastic members, the elastic members being mounted to the mounting portion so as to be aligned in a longitudinal direction of the optical component.

10. The optical component mounting structure according to claim 1, wherein
a circuit board is mounted on the flat surface portion of the base,
the optical component is placed so as to protrude with respect to an end surface of the circuit board,
the pressing portion has:
a first pressing portion that elastically comes in contact with a front part of the optical component with respect to a center of gravity position of the optical component relative to a direction in which the optical component protrudes; and
a second pressing portion that elastically comes in contact with a rear part of the optical component with respect to the center of gravity position of the optical component relative to the direction in which the optical component protrudes, and
by the first and second pressing portions, pressure is applied to the optical component toward the base via the circuit board.

11. The optical component mounting structure according to claim 10, wherein
the optical component is a light guide member that emits, from an emission surface, light that has become incident on a light receiving surface,
a light emitting element that emits light toward the light receiving surface is mounted on the circuit board,
the light receiving surface is disposed so as to be opposed to the light emitting element, and
the second pressing portion is provided so as to come in contact with an upper surface of the light guide member at a position close to the light receiving surface.

12. An image reading device comprising the optical component mounting structure according to claim 11, wherein
a contact glass on which an original document is placed is illuminated with light emitted from the light guide member.

13. An image forming apparatus comprising the optical component mounting structure according to claim 1.

14. An optical component mounting structure, comprising:
an elastic member for applying pressure to an optical component toward a flat surface portion of a base; and
a mounting portion that is provided at the base and to which the elastic member is mounted,
wherein the elastic member has:
a pressing portion that elastically comes in contact with the optical component;
a holding portion that supports one end of the pressing portion and elastically holds the mounting portion of the base; and
a member-side positioning portion that engages with a base-side positioning portion provided at the mounting portion and that is formed at the holding portion, and
wherein the optical component is placed so as to protrude with respect to an end surface of the base, and
the pressing portion has:
a first pressing portion that elastically comes in contact with a front part of the optical component with respect to a center of gravity position of the optical component relative to a direction in which the optical component protrudes; and
a second pressing portion that elastically comes in contact with a rear part of the optical component with respect to the center of gravity position of the optical component relative to the direction in which the optical component protrudes.

15. An optical component mounting structure, comprising:
an elastic member for applying pressure to an optical component toward a flat surface portion of a base; and
a mounting portion that is provided at the base and to which the elastic member is mounted, wherein
the elastic member has:
a pressing portion that elastically comes in contact with the optical component; and
a holding portion that supports one end of the pressing portion and holds elastically the mounting portion of the base,
the optical component is placed so as to protrude with respect to an end surface of the base, and
the pressing portion has:
a first pressing portion that elastically comes in contact with a front part of the optical component with respect to a center of gravity position of the optical component relative to a direction in which the optical component protrudes; and
a second pressing portion that elastically comes in contact with a rear part of the optical component with respect to center of gravity position of the optical component relative to the direction in which the optical component protrudes.

* * * * *